United States Patent

Kajitori et al.

Patent Number: 5,859,401
Date of Patent: Jan. 12, 1999

[54] WIRE ELECTRIC DISCHARGE MACHINING METHOD

[75] Inventors: Toyotada Kajitori; Yuki Kita, both of Oshino-mura, Japan

[73] Assignee: Fanuc Ltd., Yamanashi, Japan

[21] Appl. No.: 817,867

[22] PCT Filed: Aug. 22, 1996

[86] PCT No.: PCT/JP96/02348

§ 371 Date: Apr. 23, 1997

§ 102(e) Date: Apr. 23, 1997

[87] PCT Pub. No.: WO97/07921

PCT Pub. Date: Mar. 6, 1997

[30] Foreign Application Priority Data

Aug. 23, 1995 [JP] Japan ................ 7-235982

[51] Int. Cl.$^6$ .............................. B23H 7/02
[52] U.S. Cl. .............................. 219/69.12
[58] Field of Search ...................... 219/69.12

[56] References Cited

U.S. PATENT DOCUMENTS

| | | | |
|---|---|---|---|
| 4,544,819 | 10/1985 | Nomura et al. | 219/69.12 |
| 4,940,871 | 7/1990 | Watanabe | 219/69.12 |
| 5,043,550 | 8/1991 | Sakaue | 219/69.12 |
| 5,386,093 | 1/1995 | Borsari | 219/69.12 |

FOREIGN PATENT DOCUMENTS

| | | |
|---|---|---|
| 0 383 921 A | 8/1990 | European Pat. Off. . |
| 0 652 067 A | 5/1995 | European Pat. Off. . |
| 39 02 173 A | 8/1989 | Germany . |
| 61-26455 | 6/1986 | Japan . |
| 63-105822 | 5/1988 | Japan . |
| 2-65925 | 3/1990 | Japan ................ 219/69.12 |
| 2-298435 | 12/1990 | Japan ................ 219/69.12 |
| 03-245918 | 11/1991 | Japan . |
| 5-301119 | 11/1993 | Japan ................ 219/69.12 |
| 06-039646 | 2/1994 | Japan . |

*Primary Examiner*—Geoffrey S. Evans
*Attorney, Agent, or Firm*—Staas & Halsey

[57] ABSTRACT

A wire electric discharge machining method capable of performing a first machining and also a second cut-off machining based on a single machining program. A program for defining machining paths for cutting off individual male forms A1–A3 is inputted and a reserve amount $\alpha$ and a backward amount $\beta$ are set. In the first machining, the electric discharge machining is stopped with the reserve amount $\alpha$ left, and this stop position is stored. In the second cutting machining, an automatic wire connection is performed at a wire connecting position turned back by the backward amount $\beta$ from the stop position along the machined groove which is formed in the first machining, and then the male forms A are successively cut off by performing the discharge machining from the wire connecting position. A wire discharge machine has an annealing/fusing device for annealing and fusing the wire with heat generated by an electric current flow in the wire. Since the wire is made straight by the annealing and a cut end thereof is made hemispheric, the wire can be easily inserted into the machined groove.

2 Claims, 4 Drawing Sheets

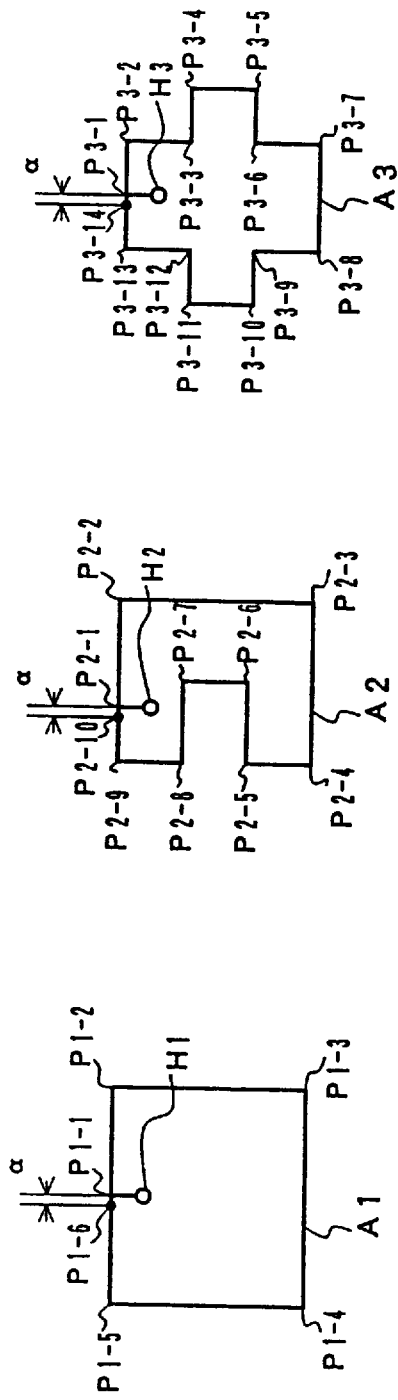

WIRE ELECTRIC DISCHARGE MACHINING METHOD

TECHNICAL FIELD

The present invention relates to a wire electric discharge machining method, and more particularly to a wire electric discharge machining method for cutting male forms off a workpiece.

BACKGROUND ART

In a wire electric discharge machining, if the machining is completed on all the commanded machining path, a male form drops to possibly collide with a lower wire guide and damage it. Especially in machining a plurality of forms from a single workpiece, when the machining of one form is completed, it is necessary to cut a wire electrode and move the workpiece to be positioned at a machining start hole for the next machining form, and to automatically connect the wire electrode through the next machining start hole. The dropped male form might slide on the lower wire guide in moving the workpiece to cause damage to the lower wire guide. Therefore, a first machining is performed on a great part of the machining form and is stopped immediately before the male form drops, to proceed to the next machining form with the male form remaining on it. Then, the electric discharge machining is performed on the next machining path to a position immediately before the male from drops. In a second machining, each male form is cut off the workpiece in the presence of an operator.

The following two methods are known for performing the second machining.

(1) The wire electrode is inserted through the machining start hole and is moved along the already machined groove with the electric discharge off (or with the electric discharge on), thereby cutting off the reserved section by the electric discharge machining. This method is adopted for a male form of relatively light weight. (2) After clamping the male and female forms so as to be bridged therebetween on the first machining path to hold the male form, the wire electrode is inserted through the machining start hole and then the workpiece is moved reversely in the second machining path to perform the electric discharge machining, thereby cutting off the reserved section.

In the method (1) of the above two methods, when the wire electrode is moved along the machined groove with the electric discharge off, the wire electrode might be stuck as it is caught by the workpiece. When the wire electrode is moved along the machined groove with the electric discharge on, the male form might be deformed as the electric discharge machining is performed twice. In the method (2), it is necessary to create a machining program to move the workpiece reversely. In either of the two methods (1) and (2), it is required to prepare two machining programs for the first machining and the second cutting-off machining.

Thus, in the foregoing conventional wire electric discharge machining methods, two programs are necessary for the first machining to leave a reserve section and the second machining to cut off a male form by machining the reserve section.

DISCLOSURE OF INVENTION

It is an object of the present invention to provide a discharge machining method capable of performing both first machining and second (cutting-off) machining based only on a single machining program.

A wire electric discharge machining method of the present invention is performed using a wire electric discharge machine having an annealing/fusing device for annealing a wire into a straight shape upstream of an upper wire guide in a wire path and fusing the wire near the upper wire guide, and an automatic wire connecting device for automatically connecting the wire by restricting the wire by a machining fluid flow from a nozzle of the upper guide.

A machining program defining a plurality of machining paths each corresponding to each male form is inputted, and a cutting reserve amount and a backward amount for a second discharge machining is set. In a first discharge machining, the wire is automatically connected through a machining-start hole in the first machining path by the automatic wire connecting device, to perform an electric discharge machining for shaping along the first machining path based on said machining program, the electric discharge machining is stopped at a stop position with said reserve amount left along the first machining path to anneal and fuse the wire by the annealing/fusing device, and performing and stopping the electric discharge machining along successive machining paths.

In the second discharge machining, the wire is automatically connected at a wire connecting position turned back by said backward amount from said stop position along a machined groove formed in the first electric discharge machining, the electric discharge machining is performed from the wire connecting position along the first machining path based on the machining program to cut off a first male form, the wire is annealed and fused by the annealing/fusing device, and the male forms are successively cut off.

The annealing/fusing device anneals the wire by flowing an electric current in the wire through two wire fusing electrodes disposed on a straight line with a predetermined distance therebetween in the wire path upstream of said upper wire guide, and fuses the wire in the vicinity of one of said wire fusing electrodes, which is disposed near the upper wire guide.

BRIEF DESCRIPTION OF DRAWINGS

FIGS. 4(a), 4(b) and 4(c) are schematic views of an example machining according to the electric discharge machining method of the invention.

BEST MODE FOR CARRYING OUT THE INVENTION

Figure 1:
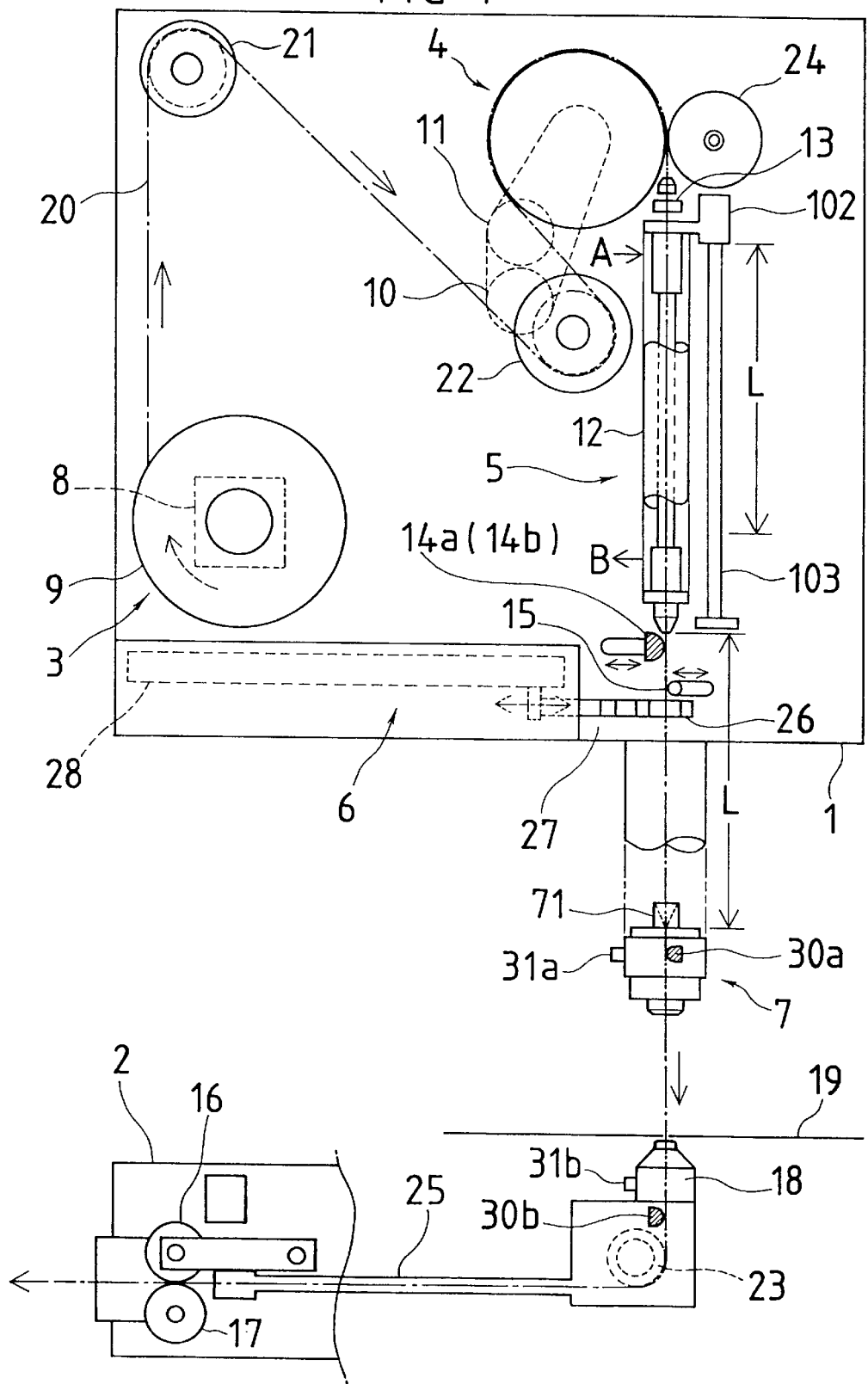
FIG. 1 is a schematic view showing a principal part of a wire electric discharge machine for carrying out a wire electric discharge machining method of the present invention.

First, a general structure of a wire electric discharge machine for carrying out the electric discharge machining method of the invention will be described, referring to FIG. 1. FIG. 1 shows a principal part of a wire electric discharge machine for carrying out the method of the invention. In FIG. 1, the whole body of the wire discharge machine is generally divided into two sections of oppositely arranged upper and lower machine frame sections 1 and 2, which are attached to a non-illustrated column so that they are vertically movable with respect to each other. The upper and lower machine sections 1 and 2 are arranged so as to adjust a distance between the upper guide 7 upstream in a wire feeding path and lower guide 8 downstream in the wire feeding path in accordance with a thickness of a workpiece to be machined.

A wire winding unit 3, a brake roller 4, a wire fusing mechanism 5, a wire lead-in unit 6 and the upper guide 7 are disposed on the upper machine section 1.

The wire winding unit 3 comprises a supply reel 9 operatively connected to a winding motor 8, and the brake roller 4 is driven by a reversible braking motor 1 via a timing belt, a powder clutch, etc. A pulse coder 1 detects the amount of rotation of the brake roller 4 (the amount of movement of the wire).

The wire fusing mechanism 5 is composed of a wire feed pipe structure 12 disposed upwardly of the upper guide 7, first and second wire fusing electrodes 13 and 14b disposed at inlet and outlet sides, respectively, of the pipe structure 12, and a pressure roller 15. The second wire fusing electrode 14b serves as a substantial wire fusing means and also as a wire-end detector as 14a.

The electrode 14b and the pressure roller 15 are movable toward and away from a wire path. Specifically, the electrode 14b and the pressure roller 15 are moved so as to enter a path of the wire 20 by a non-illustrated solenoid with a controlled current-supply when the electrode 14b is used as the wire fusing means or the wire-end detecting means, and they are moved away from the wire 20 in the electric discharge machining. The wire 20 is annealed and fused by supplying an electric current to the wire 20 via the first and second wire fusing electrodes 13 and 14b while flowing a cooling air between points A and B in the wire feed pipe structure 12. The wire 20 is heated by this electric current to be annealed. As the cooling air does not flow in the vicinity of the wire fusing electrodes 14b, the temperature of the wire 20 rises sharply in this region, as compared with a region where the cooling air flows, to fuse the wire 20.

An upper electrode 30a for machining is arranged to face the wire path in the upper guide 7 and in the electric discharge machining an electric current is supplied between the upper electrode 30a and a lower electrode 30b for machining.

In the lower machine section 2, a wire drawing roller 17, a pinch roller 16 confronting the wire drawing roller 17, and the lower guide 18 are arranged. Reference numeral 19 designates a table surface of the wire discharge machine. The lower electrode 30b for machining is disposed to face the wire path in the lower guide 18. Reference numerals 31a and 31b designate inlets from which a machining fluid is introduced and the introduced machining fluid is spouted towards the machining area from nozzles of the upper and lower guides 7 and 18.

The wire 20 drawn from the supply reel 9 is guided by deflector rollers 21, 22 to the brake roller 4, and then passes the first wire fusing electrode 13 to reach the upper guide 7 through the wire feed pipe structure 12, whereupon the wire 20 passes the lower guide 18 and is guided by the deflector roller 23 to reach the wire drawing roller 17, to thus define the wire path. The wire 20 runs along the wire path by the pulling action of the wire drawing roller 17 under a predetermined backward tension given by the brake roller 4, which is driven by the braking motor 10 under control of a constant current circuit. The lower machining electrode 30b in the lower guide 18 as well as the upper machining electrode 30a come into contact with the running wire 20 to supply an electric power for machining to the wire 20.

While the wire 20 is normally running (in the electric discharge machining), the winding motor 8 of the supply reel 9 rotates idly in a direction (indicated by a dotted-line arrow) opposite to the winding-up direction. At that time, the gripper 26 assumes an open posture out of contact with the wire 20.

Reference numeral 24 designates a pinch roller abutting a circumferential surface of the brake roller 4 to ensure the contact between the wire 20 and the brake roller 4. In the lower machine section 2, the wire 20 is inserted into a guide pipe 25 disposed between the deflector roller 23 and the wire drawing roller 17.

The wire lead-in unit 6 is composed of an arm 27 having a clamp 26 at the distal end thereof and an air cylinder 28 for retracting the arm 27, the clamp 26 being disposed downstream of the pressure roller 15. The wire pulling unit 6 serves as a means for removing the wire.

The wire feed pipe structure 12 has non-illustrated intake and exhaust ports at the respective positions indicated by arrows A and B. As is previously described, the wire 20 is annealed between the two positions A and B and fused at the position of the second wire fusing electrode 14b. The wire feed pipe structure 12 is entirely electrically insulated from the wire 20.

Further, the wire feed pipe structure 12 is supported by a slide member 102 together with the first fusing electrode 13, and the slide member 102 is driven upwardly and downwardly (through a length L) along a post guide 103 between the illustrated uppermost position and a lowermost position defined by the a positioning portion 71 on the upper guide 7 by a non-illustrated driving means. This pipe structure 12 is used for the automatic wire connection.

Figure 2:
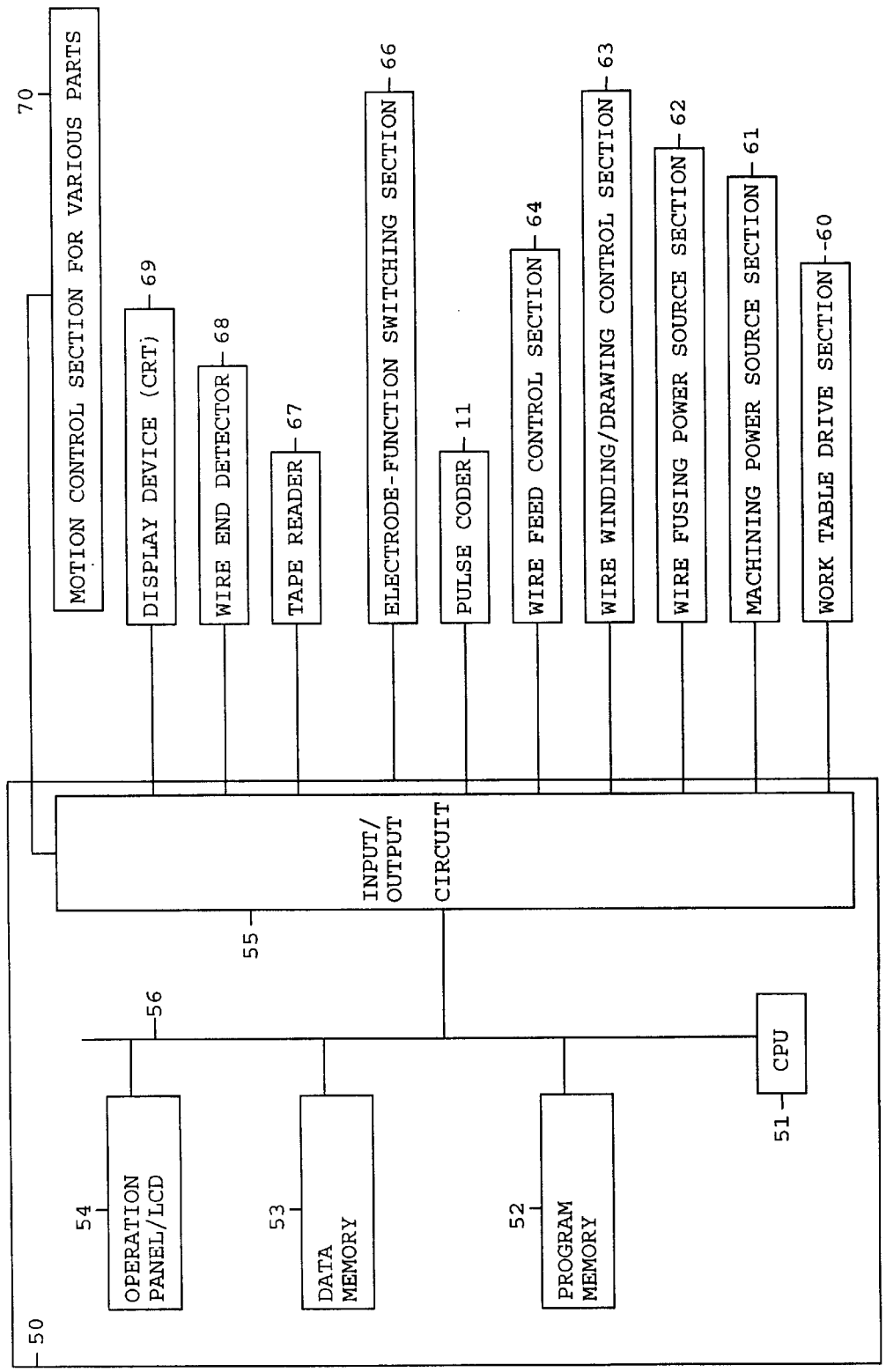
FIG. 2 is a functional block diagram of a controller of the wire electric discharge machine as shown in FIG. 1.

In FIG. 2, a reference numeral 50 designates a control system for a wire electric discharge machine, which also serves as a numerical control system for controlling the position of the table 19. The control system 50 includes a central processing unit (CPU) 51 in the form of a microprocessor, to which a program memory 52, a data memory 53, an operation panel 54 with a liquid crystal display LCD, and an input-output circuit 55 are connected via a bus 56.

The program memory 52 stores various programs for controlling individual parts of the wire discharge machine and the control system itself The data memory 53 stores a machining program and various setting data for determining machining conditions and also used for temporary storage of data in various calculations by the CPU 51.

To the input-output circuit 55, a table drive section 60, a machining power source section 61, a wire fusing power source section 62, a wire winding/drawing control section 63, a wire feed control section 64, the pulse coder 11, an electrode-function switching section 66, a tape reader 67, a wire-end detecting section 68, a CRT display device, and a motion control section 70 for controlling individual parts of the wire electric discharge machine are individually connected.

The table drive section 60 and the machining power source section 61 are of a well known constitution and controlled according to the ordinary method in executing the electric discharge machining. The wire fusing power source section 62 supplies necessary electric power to the first and second wire fusing electrodes 13 and 14b. The wire winding/drawing control section 63 controls a motor (not shown) for driving the wire drawing roller 16 and the winding motor 8.

Further, the wire feed control section 64 controls the motor 10 for driving the brake roller 4, and the amount of rotation of the brake roller 4 is detected by the pulse coder 11, as previously mentioned.

The electrode-function switching section 66 selectively switches the function of the second wire-fusing electrode between the second wire-fusing means as 14b and the wire-end detecting means as 14a, and a wire-end detection signal from the electrode 14b as the wire-end detecting means is inputted to the wire-end detector 68.

The motion control section 70 for various parts controls the back and forth motions of the second wire-fusing electrode 14b and the upward and downward motions of the pipe structure 12, etc.

The method of the present invention is carried out using the wire electric discharge machine having the above-described wire annealing/fusing function and automatic wire connecting function. For cutting the connected wire electrode, an annealing/fusing process is performed according to the following procedure. After stopping the machining and invalidating all the machining conditions, the driving of the wire drawing roller 17 and the brake roller 4 is stopped. Then, cooling air is supplied into the pipe structure 12 via the intake port and the wire 20 is gripped by the gripper 26. While pulling the wire 20 in the winding direction by driving the winding motor 8, an electric current is supplied to the wire 20 between the wire fusing electrodes 13 and 14b through these electrodes 13 and 14b to heat and anneal the wire 20 . At that time, the temperature of the wire 20 rises sharply at the position of the second wire-fusing electrode 14b where no cooling air flows and, as a result, the wire 20 is fused at that position. When the wire 20 is fused, the pulling of the wire 20 by the winding motor 8 is stopped and the gripping of the wire 20 by the gripper 26 is released, whereupon the lower side of the fused wire is collected into a wire collecting box by driving the wire drawing roller 17. Then, the brake roller 4 is driven to feed the upper side of the fused wire until a cut end thereof is detected by the wire-end detector 14a, to terminate the wire cutting process. Curls of the upper-side wire between the first and second wire-fusing electrodes 13 and 14b is eliminated by the annealing to thereby make the wire straight, and at the same time the cut end of the upper-side wire is shaped into a hemisphere having a smooth surface by the fusing.

In an automatic wire connecting process, while feeding the wire 20 by driving the brake roller 4 by the braking motor 10, the wire feed pipe structure 12 is lowered to be engaged with the positioning portion 71. Then, the machining fluid is supplied to the wire feed pipe structure 12 and the guide pipe 25 to flow there in the wire-running direction, and at the same time the machining fluid is spouted from the nozzle of the upper guide 7 to facilitate feeding of the wire 20 by the brake roller 4. Since a leading end of the wire 20 has the hemisphere shape with the smooth surface by the fusing, and the wire 20 is made straight by the annealing, the wire 20 restricted by the machining fluid is inserted into the machined groove smoothly. When it is detected (by a non-illustrated detector) that the wire 20 has passed the wire drawing roller 17 and the pinch roller 16 as guided by the machining fluid flowing in the guide pipe 25, the automatic wire connecting process is terminated. The annealing/fusing process and automatic wire connecting process are described in detail in International Application PCT/JP96/01245 and International Laid-Open Publication WO95/02482, for example.

FIGS. 4(*a*), 4(*b*) and 4(*c*) show an example of machining in which three male forms are cut off a single workpiece according the electric discharge machining method of the invention. In the machining program, a first machining path from a machining-start hole H1 through intermediate positions P1-1, P1-2, P1-3, P1-4, P1-5 to the final position P1-1 for cutting off a male form A1, a second machining path from a machining-start hole H2 through intermediate positions P2-1, P2-2, . . . , P2-9 to the final position P2-1 for cutting off a male form A2, and a third machining path from a machining-start hole H3 through intermediate positions P3-1, P3-2, . . . , P3-13 to the final position P3-1 for cutting off a male form A3 are programmed, and the machining program is inputted in the data memory 53 via the tape reader 67. Further, a cutting reserve amount $\alpha$ and a backward amount $\beta$ for a second (cutting-off) machining are set and stored in the data memory 53 from the operation panel 54.

When a first machining command is inputted, the processor 51 performs the above-described automatic wire connecting process at the machining-start hole Hi in the first machining path. Then, the processor 51 performs the electric discharge machining along the programmed machining path from the machining-start hole H1 to the position P1-5 and continues the machining on the final block (from the position P1-5 to the position P1-1) to stop the machining at the position P1-6 where a left amount of the motion reaches the set reserve amount $\alpha$ (Since the processor 51 reads the machining program one block ahead, it can anticipate the final machining block for cutting off the male form A1). The processor 51 stores data representing the position P1-6 in the data memory 53. Subsequently, the processor 51 performs the above-described wire annealing/fusing process, and moves the workpiece to the machining-start hole H2 of the second machining path to perform the automatic wire connecting process at the machining-start hole H2, whereupon the processor 51 performs the electric discharge machining along the machining path from the machining-start hole 2 to the position P2-9. When a left amount of the motion from the position P2-9 reaches the set reserve amount $\alpha$, the processor 51 stops the machining and stores data representing the position P2-10 in the data memory 53, then performs the wire annealing/fusing process, and then moves the workpiece at the position of the machining-start hole H3 of the third machining path. The processor 51 performs the automatic wire connection at the position of the machining start hole H3, then performs the electric discharge machining from the machining-start hole H3 to the position P3-13 along the programmed machining path. The processor continues the machining to the position P3-14 where a left amount of the motion reaches the cutting reserve amount $\alpha$, whereupon the processor 51 stores data representing the position P3-14 in the data memory 53 and performs the wire annealing/fusing process, thus completing the first machining.

Upon completion of the first machining, an operator clamps the individual male forms and the female form to be bridged on the groove machined in the first machining so as to hold them and inputs a second machining command.

Figure 3:
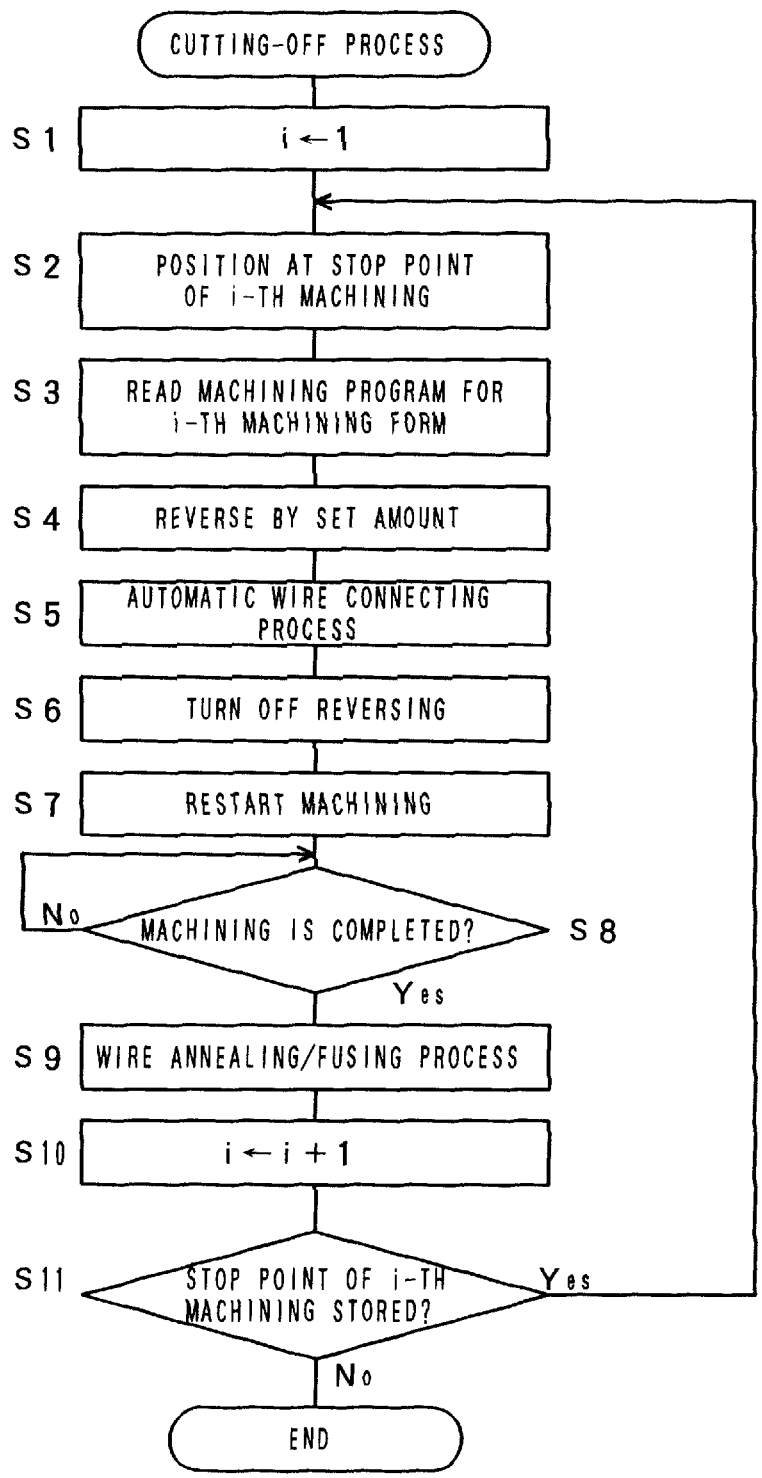
FIG. 3 is a flowchart showing the process of cutting off male forms according to one embodiment of the invention.

When the second machining command is inputted, the processor 51 starts the male-form cutting-off process shown in the flowchart of FIG. 3. First, the processor 51 sets the index i to "1" (Step S1), then reads a position stored in the i-th address (the first position is P1-6 in the example of FIG. 4) of the data memory 53 which stores the machining-stop positions, and then positions the workpiece so that the wire path between axes of the upper guide 7 and the lower guide 18 is aligned with the read position (Step S2). The processor 51 reads the machining program for the i-th machining form, and then performs a reverse process to move the workpiece backwardly by the set backward amount β from the read position along the machining path of the machining program so that the wire path is aligned with the position upstream of the position P1-6 by the set backward amount β (Steps S3, S4). The above-described automatic wire connecting process takes place at this position. The wire is automatically connected through the machined groove formed in the first machining (Step S5). As the wire 20 has been fused, a leading end thereof has a hemisphere shape with a smooth outer surface, and as the wire 20 has been annealed by heating it is made straight. Further, since the position at which the automatic wire connection is performed is set by turning back the machined groove by the backward amount β from the machining-stop position, spaces are formed horizontally symmetrically with respect to the wire when inserting the wire into the groove defined by two cut surfaces, so that possible disturbance of the machining fluid spouted in the automatic wire connecting is reduced. Accordingly, the wire is easily inserted through the machined groove as restricted by the machining fluid at the wire connecting position.

After the automatic wire connecting process has been completed, the processor 51 turns off the reverse process and then restart the electric discharge machining from the wire connecting position to perform the machining according to the machining program to the end point of the machining shape, to cut off the male form (Step S7, S8). If the index i is "1", the processor 51 performs the electric discharge machining from the position P1-6 to the position P1-1 to cut off the male form A1.

Further, the processor 51 performs the above-described wire annealing/fusing process and increase the index i by "1" (Steps S9, S10) and then discriminates whether or not the machining stop position is stored in the i-th address of the data memory (Step S11). If it is stored, the processor 51 reads the machining stop position and then returns to the Step S2 to repeat the foregoing processes.

Namely, if the index i is "2", in the example of FIG. 4, the processor performs the automatic wire connecting process at the position turned back by the backward amount β along the machining path for the male form A2 from the position P2-10, and then performs the electric discharge machining from the wire connecting position by the reserve amount α, to thereby cut off the male form A2. Likewise, the processor 51 performs the automatic wire connecting process at the position turned back by the backward amount β from the position P1-14 in the machining path for the male form A2, and then performs the electric discharge machining by the reserve amount α, thus completing the second machining.

As described above, according to the present invention, the first machining and also the second machining for cutting off the male form can be performed based on a single machining program by setting the reserve amount and the backward amount. It is therefore not necessary to create first and second machining programs individually which are required in the prior art. Further, as the automatic connecting process is performed at the position turned back by the backward amount along the machining path from the position where the machining is reserved by the reserve amount and the discharge machining is started at that position in the second machining, the second machining is performed speedily to thereby reduce the machining time.

We claim:

1. A wire electric discharge machining method for cutting a plurality of male forms off a workpiece using a wire electric discharge machine having an annealing/fusing device for annealing a wire into a straight shape upstream of an upper wire guide in a wire path and fusing the wire near the upper wire guide, and an automatic wire connecting device for automatically connecting the wire by restricting the wire by a machining fluid flow from a nozzle of the upper guide, said method comprising the steps of:

(a) inputting a machining program defining a plurality of machining paths corresponding to the respective male forms and setting a reserve amount for a first electric discharge machining and a backward amount for a second discharge machining;

(b) performing the first discharge machining by (b1) automatically connecting the wire through a machining-start hole in the first machining path by said automatic wire connecting device, to perform an electric discharge machining for shaping along the first machining path based on said machining program, (b2) stopping the electric discharge machining at a stop position with said reserve amount left along the first machining path, to anneal and fuse the wire by said annealing/fusing device, and (b3) performing and stopping the electric discharge machining along successive machining paths in the same manner as said steps (b1) and (b2); and (c) performing the second discharge machining by (c1) automatically connecting the wire at a wire connecting position turned back by said backward amount from said stop position in said step (b2) along a machined groove formed in the electric discharge machining of said step (b1), (c2) cutting off a first male form by performing the electric discharge machining from said wire connecting position along the first machining path based on said machining program, (c3) annealing and fusing the wire by said the annealing/fusing device, and (c4) cutting off said plurality of male forms successively in the same manner as said steps (c1), (c2) and (c3).

2. A wire electric discharge machining method according to claim 1, wherein said annealing of the wire by said annealing/fusing device is performed by flowing an electric current in the wire through two wire fusing electrodes disposed on a straight line with a predetermined distance therebetween in the wire path upstream of said upper wire guide, and said fusing of the wire is performed in the vicinity of one of said wire fusing electrodes, which is disposed near the upper wire guide.

* * * * *